June 5, 1928. 1,672,577
F. A. NILSSON
FRICTION CLUTCH
Filed Sept. 21, 1925 2 Sheets-Sheet 1

Inventor
Fritz Albert Nilsson
by Henry Orth
Atty

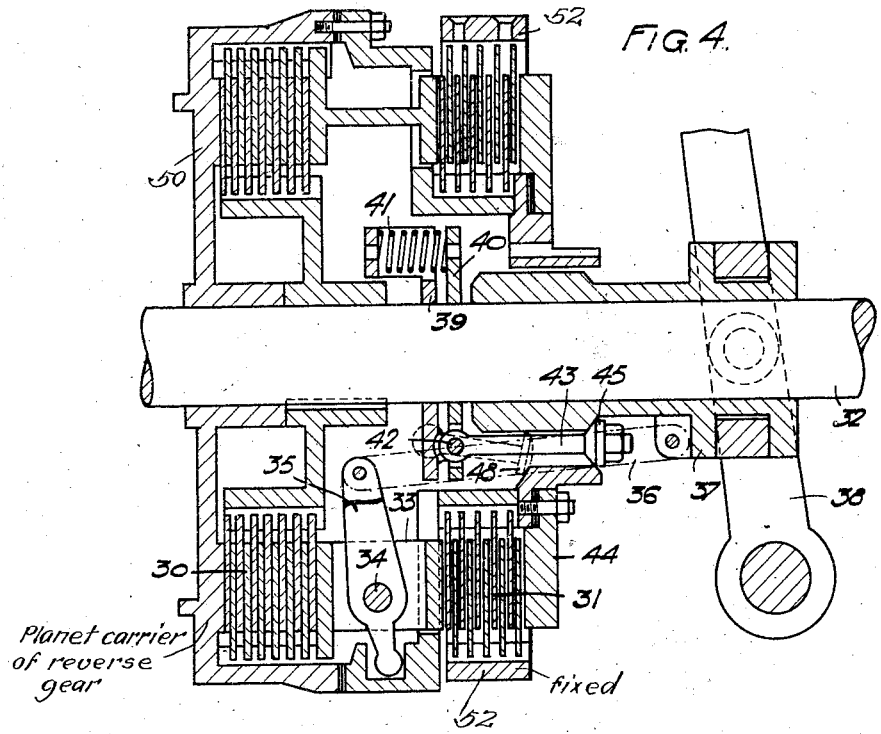
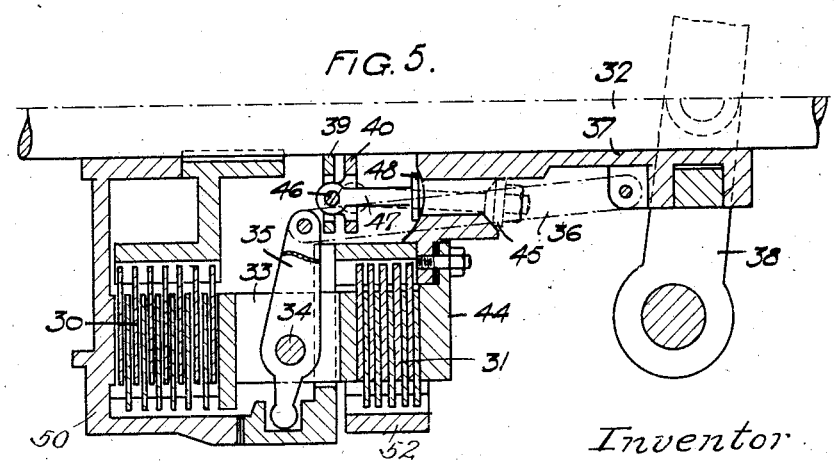

Patented June 5, 1928.

1,672,577

UNITED STATES PATENT OFFICE.

FRITZ ALBERT NILSSON, OF AUGUSTENDAL, NEAR STOCKHOLM, SWEDEN.

FRICTION CLUTCH.

Application filed September 21, 1925, Serial No. 57,704, and in Sweden August 23, 1924.

The present invention relates to that type of friction clutches of the multiple disk type in which the bringing of the friction elements into driving contact with each other is effected by means of one or more springs acting on the friction elements either directly or, in order to enable a reduction of the number of friction elements and avoid the use of too stiff springs, by means of levers in which case the springs act on the longer arms of said levers. In clutches of the type above referred to the springs are subjected to heavy compressive stresses, especially when levers are used, as the friction elements are separated in releasing of the clutch. As a result, the springs will have their lowest tension when the clutch is in operation and the springs should produce frictional engagement between the friction elements, but will have their highest tension when the clutch is released and no action of the springs is required. Another drawback is that the springs render the release of the clutch and the maintaining of the clutch in released state difficult.

The object of this invention is to provide an improved clutch in which said inconveniences are avoided.

The invention is characterized, chiefly, therein that the springs are connected to the friction elements or to the levers, or to members acting thereon, by intermediate means which, upon the release of the clutch, are automatically removed from connection with the friction elements or the levers, as the case may be, and will transmit their action from the friction elements to a stationary member of the clutch.

In the accompanying drawings two embodiments of the invention are illustrated.

Figure 2:
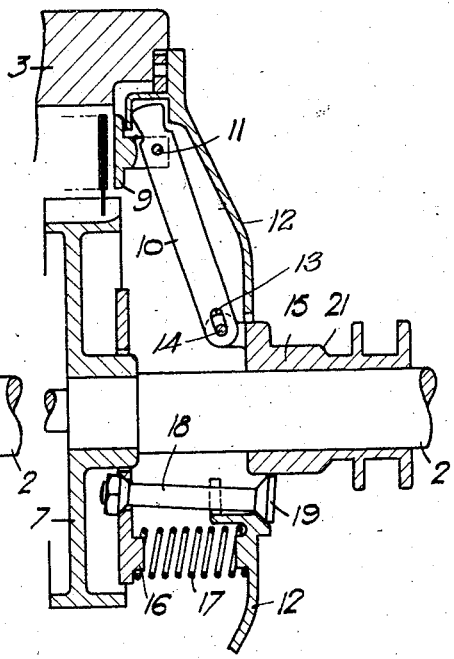
Fig. 2 is a longitudinal section of part of the clutch, showing the clutch in released state.

Fig. 2ª is a longitudinal section of part of the clutch, showing the clutch in operative position.

Figure 3:
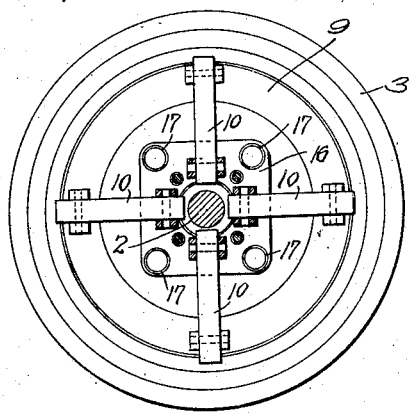
Figure 2A:
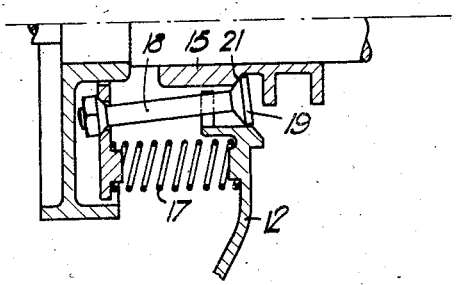

Fig. 3 is an end view on a reduced scale, with parts in section and other parts removed, of the same clutch.

Fig. 4 is a longitudinal section of a clutch according to the other embodiment, said clutch being constructed as a reversing mechanism, showing one of the groups of friction elements of the clutch in operative position.

Fig. 5 is a longitudinal section of part of said reversing mechanism, showing the other group of friction elements in operative state.

Figure 1:
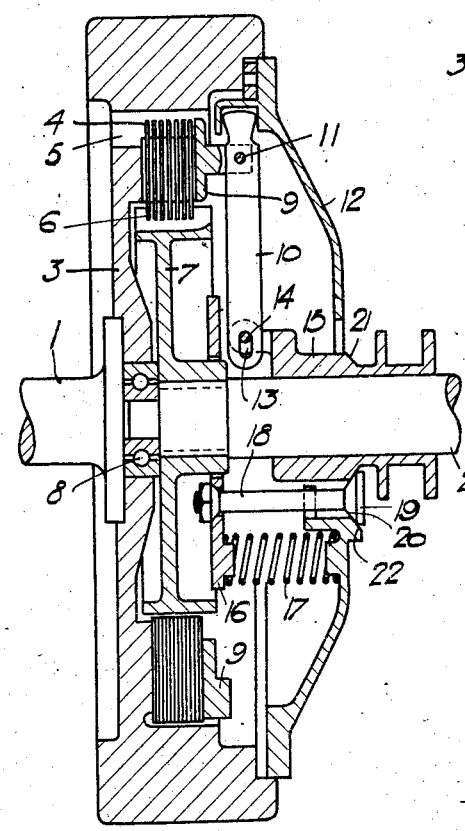
Fig. 1 is a longitudinal section of a clutch according to one embodiment, showing the clutch in an intermediate position.

Referring first to the form of clutch shown in Figs. 1–3 of the drawings, the numeral 1 designates a driving shaft, as, for instance, the crank shaft of an internal combustion engine, and 2 is a shaft to be driven by the clutch. Secured to shaft 1 is a disk or flywheel 3 carrying a plurality of disk-shaped clutch elements 4 engaging guiding notches 5 formed in the member 3 in well known manner. Similar clutch elements 6 for cooperation with the clutch elements 4 are carried and guided by a disk 7 keyed to the driven shaft 2. Preferably inserted between adjacent ends of the shafts 1 and 2 is a ball bearing 8, adapted to guide the shafts with relation to each other, and to constitute a bearing for said shaft 2 in the released state of the clutch.

Slidably mounted outside the clutch elements is a ring 9 engaging the guiding notches 5, said ring carrying a plurality of radial levers 10 pivoted by means of journals 11 to projections or lugs of the ring 9. The outer, shorter arms of the levers 10 engage a notch formed in a cover 12, secured, as by screws or the like, to the disk 3. The inwardly directed, longer arms of the levers 10 are formed at their inner ends with elongated apertures 13 engaged by pins 14 carried by a sleeve 15 slidably mounted on the driven shaft 2. Said apertures 13 and pins 14 constitute a slidable and pivotal connection between said longer lever arms and said sleeve 15. The longitudinal movement of said sleeve may be controlled by well known means (not shown).

Inserted between the cover 12 and a disk or plate 16 slidably mounted on the hub of disk 7 are a series of spiral springs, one of which is indicated at 17. Said spiral springs will thus tend to remove the disk 16 from the cover 12. Pivotally connected to the disk 16 with their one ends are a series of bolts 18. Said bolts extend substantially parallel to the shaft 2 and are provided at their opposite ends with heads 19 having a bevelled or conical lower surface 20 the inclination of which relatively to a plane perpendicular to the axis of the bolt is somewhat larger than the angle of friction of the material of the bolt.

The slidable sleeve 15 and the cover 12 are each provided with correspondingly bevelled or conical surfaces 21 and 22, respectively, adapted to be engaged by the conical surfaces 20 of the heads of the bolts. The distance between said conical surfaces 21 and 22 is such as to enable the bolts 18 to be fully removed from engagement with any of said conical surfaces 21 or 22 by a swinging movement directed radially inwardly or outwardly.

With the clutch in driving engagement, the parts thereof will occupy the position shown in Fig. 2ᵃ. In this position, the conical lower surfaces of the heads 19 of the bolts 18, one of which only is illustrated in the drawings, are only in engagement with the surface 21 of the sleeve 15, while the outer cylindrical portions of the heads bear with a gentle pressure against the inner cylindrical surface of the cover 12. In this position, the springs 17 will maintain the sleeve 15 displaced to its extreme left position, in which position said sleeve exerts a compressive action on the friction elements by the aid of the levers 10.

When it is desired to throw the clutch out of driving engagement, the sleeve 15 is moved to the right causing the levers 10 and ring 9 to move as well. In this movement the heads 19 of the bolts 18 are fully brought out of contact with the surface 21, as will appear from Fig. 2. The spring pressure will, as a result, be completely removed from the sleeve 15 and thus also from the levers 10 and the friction elements 4, 6, and will be transmitted to the non-sliding cover 12 so that the friction elements 4, 6, due to a continued longitudinal movement of the sleeve 15, may be freely separated to such an extent as the mechanism allows, and as is required for securing a sufficient release of the friction elements. Furthermore, the sleeve 15 when displaced, has no tendency to restore automatically, as it is no longer under the pressure of springs, and as a result, the clutch will remain in released state.

The form of clutch shown in Figs. 4 and 5 constitutes a reversing mechanism constructed on the principles underlying the above described multiple disk clutch. With reference to Figs. 4 and 5, it is to be noted that two sets of friction elements 30 and 31 are provided, each set being adapted to transmit rotary movement in a different direction from a driving member, not shown, to a shaft 32 to be driven. As an example, the member 50 carrying the driving series of the set 30 may be connected to the planet carrier of a planetary reverse gear mechanism (not shown). The member 52 carrying one series of discs of set 31 is stationary.

The two sets of disks 30, 31, which are adapted to operate alternately, are controlled by means of an axially movable common ring 33 located between the two sets of disks, and having one operating surface for each of said sets. Pivoted to the ring 33 by means of journals 34 are levers 35 connected by links 36 to a control sleeve or bushing 37 slidably mounted on the shaft 32 and capable of being controlled by means of the hand lever 38.

The mechanism further includes two axially movable rings or disks 39, 40. Inserted between said disks are a number of spiral springs 41, one of which is shown in Fig. 4. Pivoted to lugs of the ring 39 by means of journals 42 (see Fig. 4) are bolts 43 carrying at their opposite ends preferably adjustable heads 45 having as in the embodiment above described bevelled or conical lower surfaces adapted to alternately engage bevelled or conical surfaces on the sleeve 37 and on a ring 44, rigidly connected to the member 50. Similarly, the ring 40 carries by means of lugs and journals 46 (see Fig. 5) a number of bolts 47 carrying adjustable heads 48 at their opposite ends. Said heads are formed with conical top surfaces to alternately engage bevelled or conical surfaces on the sleeves 37 and on the ring 44.

With the sleeve 37 moved to the left, as in Fig. 4, the set of disks 30 is in operative engagement connecting the driving member 50 to the shaft 32 which is thereby caused to rotate in the same direction and at the same speed as the member 50. In such case the heads 48 of the bolts 47 are moved out of engagement with the respective conical surface of sleeve 37, as is shown by dotted lines in Fig. 4. The springs 41 tending to separate the disks 39, 40 have, through the intermediary of the disk 40 and the bolts 47, their support on the member 44 and act through disk 39 and bolts 43 to move the sleeve 37 to the left. The springs 41 will thus maintain the clutch 30 in operative engagement.

With lever 38 moved to the position shown in Fig. 5, the sleeve 37 is moved to the right causing the set of disks 30 to release and bringing the set of disks 31 into operation. The disks 31, when in operation, connect the member 44 to the stationary member 52 thereby preventing member 44 and thus also the member 50 from rotation. The shaft 32, however, is not prevented from rotation as no power is in this case transmitted by the set of discs 30, which, as mentioned, are in a released state. The shaft 32 may now be rotated in opposite direction to that previously mentioned by means of a reversing gear, not shown. In this movement the heads 45 will move out of engagement with the bevelled or conical surface of the sleeve 37 and come to rest against the member 44, as shown in Fig. 5. The springs 41 will now receive their support from said stationary disk by means of the bolts 43 and the disk 39 and, as a result, they will tend to move the disk 40 to the right. The bolts 47 will thus move the sleeve 37 to the right by means of their heads thereby maintaining the clutch 31 in operative state.

What I claim is:

1. In a friction clutch, disk-shaped friction elements, levers associated with the latter, a movable member to control said levers, pivoted locking members adapted to act on said movable member, springs to transmit the action of the pivoted members to said movable member in one position, and means to release the action of the pivoted members when the movable member is moved from said position.

2. In a friction clutch, disk-shaped friction elements, levers associated with said friction elements, a slidable member connected to said levers, said slidable member having a bevelled contact surface, a non-sliding member having an oppositely bevelled contact surface, bolts having heads at one end adapted to alternately engage said bevelled surfaces, another slidable member, to which said bolts are pivoted at their opposite ends, and springs inserted between said non-sliding member and said last mentioned slidable member.

In testimony whereof I have signed my name.

FRITZ ALBERT NILSSON.